Nov. 12, 1968 L. J. COLBERT Re. 26,491
CABLE SPLICING DEVICE
Original Filed Dec. 27, 1961
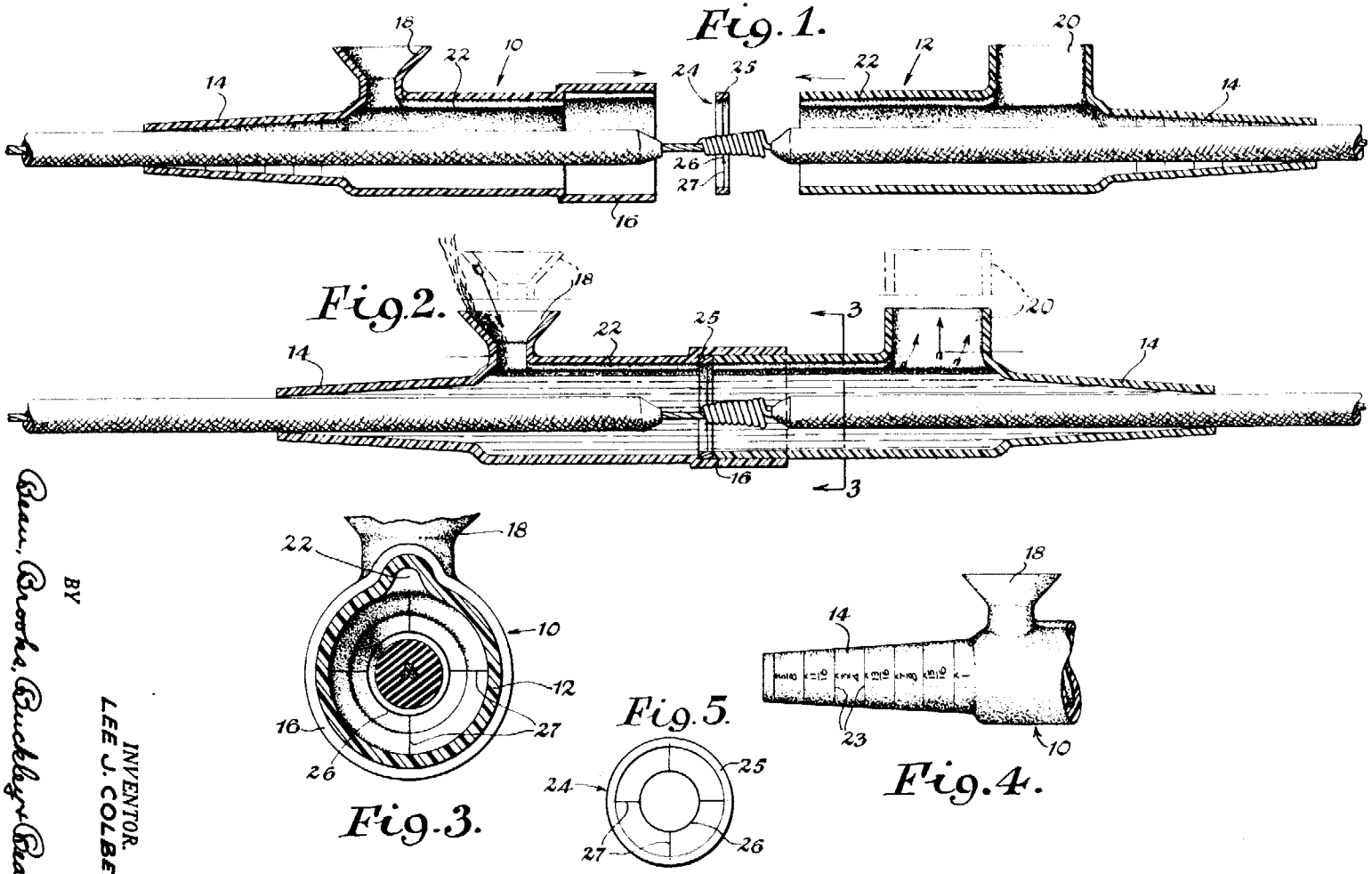
INVENTOR.
LEE J. COLBERT
BY
Bean, Brooks, Buckley & Bean
ATTORNEYS United States Patent Office Re. 26,491
Reissued Nov. 12, 1968

26,491
CABLE SPLICING DEVICE

Lee J. Colbert, 202 Jefferson Ave., Allegany, N.Y. 14706; Dolores B. Colbert, executrix of said Lee J. Colbert, deceased Original No. 3,145,421, dated Aug. 25, 1964, Ser. No. 162,475, Dec. 27, 1961. Application for reissue Apr. 12, 1966, Ser. No. 547,069
9 Claims. (Cl. 249—90)

Matter enclosed in heavy brackets [ ] appears in the original patent but forms no part of this reissue specification; matter printed in italics indicates the additions made by reissue.

*ABSTRACT OF THE DISCLOSURE*

*A two part device of flexible plastic material for closely enveloping a plurality of electrical conductors and providing a chamber enveloping the splice or joint formed between such conductors to receive encapsulating material, each of said parts having essentially tubular body portions with interfitting means at one end thereof, and a gradually tapered extension at the other end having walls disposed at a relatively slight angle to the axis thereof adapted, by cutting off at an appropriate point longitudinally of said extension to closely engage an associated conductor regardless of substantial variation in conductor diameter, each of said parts having a radially protruding passage in the tubular body adjacent to its juncture with said tapered end, and at least one of said extensions being flared to facilitate introduction of encapsulant through said passage. The walls of each tubular body suitably have a longitudinal offset defining an internal vent channel extending to said passage. When the longitudinal offset extends to the interfitting portion of each tubular body this provides means for aligning the radial passages in assembling the two parts. In a preferred adaptation of the device the assemblage includes a centering device slidably engaging the outer surface of a conductor, and the inner surface of the tubular body, said centering device being of open construction to permit free flow of encapsulant therethrough.*

[This invention relates to cable splicing devices and more particularly to a new and improved pod or mold for use in connection with the potting or encapsulating of splices or joints in electrical conductors and the like.]

The primary object of the invention is to provide a new and improved splice encapsulating pod which may be used with greater ease and speed than prior art devices.

One specific object of the invention is to provide a pod as aforesaid which comprises only two, easily manipulated, parts.

Another object of the invention is to provide a pod as aforesaid which offers improved sealing of the ends thereof around the cable being spliced.

Still another object of the invention is to provide a pod as aforesaid which includes efficient means for avoiding the entrapment of air in the resin or the like which is used to encapsulate the splice.

Other objects and advantages of the splicing pod of the invention will appear from the detailed description hereinbelow and the accompanying drawings wherein:

FIG. 1 is a sectional view of the splicing pod of the invention before the pod is assembled in potting material receiving position;

FIG. 2 corresponds to FIG. 1 but shows the pod in assembled position with the encapsulating step completed;

FIG. 3 is a sectional view taken substantially along line 3—3 of FIG. 2;

FIG. 4 is a fragmentary elevational view of the device of FIG. 1; and

FIG. 5 is an elevational view of one part of the pod of the invention.

Referring now specifically to FIG. 1, one specific embodiment of a splicing pod of the invention is shown to comprise two generally cylindrical tube members 10 and 12, the outer end of each segment being provided with a tapered portion 14 and with the inner end of the segment 10 being provided with an expanded section 16. Thus the two sections may be brought together with the inner end of segment 12 fitting telescopically with the expanded portion 16 of segment 10 (FIG. 2). The segment 10 is further provided with a funnel opening section 18 and the segment 12 is provided with an air vent opening 20. Both segments are formed with a venting channel 22 which extends from the funnel portion 18 and the venting opening 20 respectively to the inner ends of the respective segments 10 and 12.

As seen in FIG. 4 the tapered end portions as illustrated on the segment 10 are provided with markings 23 indicating its inner diameter at the points so marked so that when it is desired to use the splicing pod with a specific cable the tapered ends of the segments 10, 12 may be cut off at the point where the inner diameter is substantially the same as the outer diameter of the cable being spliced, thus assuring a snug fit between the pod ends and the cable. *The inherent flexibility and/or the possible translucent nature of the plastic material of the segments 10, 12 also facilitates accurate visual gauging of the desired point of cut-off when a cable end is inserted through the tubular portion and into firm inner engagement with the tapered end of a segment.*

In use, the tapered ends of the respective segments of the pod are cut off as described hereinabove and one of the segments is slipped over each of the ends of the cable to be spliced as seen in FIG. 1. The splicing of the cables is then executed in any of the various known methods.

When the splice is ready for potting the two segments are slipped together as seen in FIG. 2. The pod is then ready to receive any one of the prepared splice potting materials which may be used (usually a quick-hardening resin), the material being poured into the pod through the funnel opening 18. The ends of the pod are sealed by the close fit of the end portions thereof to the cable and entrapment of air during the pouring operation, which has been a problem in a number of the prior art devices, is avoided by the provision of the venting channel 22 which terminates at the venting opening 20. After the encapsulating material has solidified, the protruding funnel end and vent portions may be cut off to provide a pod without protuberances or in some cases it may be desired to slit the pod lengthwise and peel it off thereby giving a finished splice of lesser diameter.

In order to assure having a certain minimum thickness of the encapsulating material covering the spliced area at all points therearound, a locating web 24 may be used as an aid in assuring that the position of the device being spliced is maintained sufficiently near the center of the pod throughout its length. The locating web is shown to comprise an outer supporting ring 25 which may be formed of the same material as the pod and an inner circular web 26 of much finer construction which can be held within the supporting ring by very fine strands 27 of any desirable material such as nylon. The web and strands 26, 27 may be desirably fabricated from material which will disssolve in and be absorbed by the encapsulating material so that there will be no paths through the material having dielectric properties differing from the encapsulating material. The locating web is dimensioned to fit within the assembled pod as shown in FIG. 2.

From the foregoing it will be apparent that the splicing pod of the invention provides means for forming potted splices with extreme facility, a minimum number of parts to be handled and with a superior end seal which is accomplished without entailing time consuming steps such as wrapping the ends of the pod with tape or similar devices as are necessary with most of the previously known pods.

Although only one form of the splice potting pod of the invention has been shown and described in detail it will be appreciated that changes and modifications may be made therein without departing from the spirit of the invention or the scope of the appended claims.

What is claimed is:

1. A member for potting splices, comprising a pair of sections adapted to be engaged at their inner ends to form a pod encapsulating a spliced conductor, each section including a cylindrically tubular main body portion and a gradually tapered outer end portion joined to the main body portion.

one section having a filling neck adjacent the juncture between its main body and outer end portions and the other section having a vent neck adjacent the juncture between its main body and outer end portions, the inner end of one of said sections being enlarged to receive the inner end of the other section and the two sections having outwardly deformed wall portions extending from their inner ends to their respective necks to (a) align said necks when the sections are engaged and (b) form an internal vent channel extending between said necks.

2. The assembly as defined in claim 1 including an outer supporting ring received within said enlarged inner end of one of said sections, an inner supporting ring adapted to embrace the spliced member, and strand means interconnecting said inner and outer supporting rings to maintain the same in concentric, coplanar relation.

*3. The assembly as defined in claim 1 including a conductor centering device disposed between said filling neck and said vent neck and supported by one of said sections.*

*4. A member for potting splices, comprising*

*a pair of sections adapted to be engaged at their inner ends to form a pod encapsulating a spliced conductor,*

*each section including a tubular main body portion and a tapered outer end portion joined to the main body portion, the inner ends of said sections being dimensioned for telescopic engagement to define an elongate horizontal chamber for potting fluid in which the chamber is closed at the opposite ends thereof by a conductor passing through the small ends of said outer portions of the two sections,*

*an upstanding filling neck on one section having a mouth communication with said chamber at the juncture between the main body and outer end portions of such one section and defining a first potting fluid reservoir disposed above the level of said chamber whereby gaseous inclusions which may be present in a potting fluid in said chamber within the region thereof defined by the outer end portion of said one section will migrate to said first reservoir, an upstanding vent neck on the other section having a mouth communicating with said chamber at the juncture between the main body and outer end portions of such other section and defining a second potting fluid reservoir disposed above the level of said chamber whereby gaseous inclusions which may be present in a potting fluid in said chamber within the region thereof defined by the outer end portion of said second section will migrate to said second reservoir,*

*each section having an inner wall surface defining a vent channel extending longitudinally thereof along the upper side of said chamber from the region of joining between such sections and extending to the mouths of the respective necks, whereby gaseous inclusions which may be present in a potting fluid within said chamber in the region thereof between said necks will migrate along said channels to the reservoirs defined by the respective necks.*

*5. The assembly as defined in claim 4 including a conductor centering device disposed between said filling neck and said vent neck and supported by one of said sections.*

*6. The assembly as defined in claim 5 wherein said centering device is provided with passages for freely passing potting fluid therethrough.*

*7. The assembly as defined in claim 4 including an outer supporting ring received within said enlarged inner end of one of said sections, an inner supporting ring adapted to embrace the spliced member, and strand means interconnecting said inner and outer supporting rings to maintain the same in concentric, coplanar relation.*

*8. A member for potting splices in electrical conductors, comprising a pair of sections having essentially cylindrical main body portions with inner open ends of said sections having means for joining the same in coaxial alignment, outer ends of said sections terminating in outwardly protruding convergently tapered extensions, each of said sections having in the cylindrical portion thereof, adjacent said tapered extension, an aperture with a radially protruding periphery providing access to the chamber formed by the assembled sections, with the radially protruding pheriphery of at least one of said apertures including a flared, funnel-like contour facilitating introduction of fluid potting material to said chamber, means characterizing said tapered end portions to facilitate accurate cut-off for close peripheral engagement with outer surfaces of conductors entering said sections, and a conductor engaging and centering device slidably fitting within the tubular body portion of at least one of said sections.*

*9. The assembly as defined in claim 8 wherein said centering device has passages providing for the free flow of potting fluid therethrough.*

References Cited

The following references, cited by the Examiner, are of record in the patented file of this patent or the original patent.

UNITED STATES PATENTS

| | | | |
|---|---|---|---|
| 2,461,600 | 2/1949 | Gray | 249—97 |
| 2,501,863 | 3/1950 | Cox | 18—36 XR |
| 2,561,351 | 7/1951 | Fentress | 18—36 XR |
| 2,967,795 | 1/1961 | Bollmeier et al. | |
| 3,044,037 | 7/1962 | Honig. | |
| 2,312,652 | 3/1943 | Komives et al. | |
| 2,357,998 | 9/1944 | Campbell. | |
| 2,973,501 | 2/1961 | Mapelsden et al. | |

WILLIAM J. STEPHENSON, *Primary Examiner.*